United States Patent
Makker et al.

(10) Patent No.: US 7,928,171 B2
(45) Date of Patent: *Apr. 19, 2011

(54) INTRAOCULAR LENS MATERIALS SUITABLE FOR INSERTION THROUGH A SMALL BORE CARTRIDGE

(75) Inventors: Harish C. Makker, Mission Viejo, CA (US); Michael D. Lowery, Vista, CA (US); Can B. Hu, Irvine, CA (US)

(73) Assignee: Abbott Medical Optics Inc., Santa Ana, CA (US)

( * ) Notice: Subject to any disclaimer, the term of this patent is extended or adjusted under 35 U.S.C. 154(b) by 1623 days.

This patent is subject to a terminal disclaimer.

(21) Appl. No.: 11/027,876

(22) Filed: Dec. 29, 2004

(65) Prior Publication Data

US 2005/0143751 A1    Jun. 30, 2005

Related U.S. Application Data

(60) Provisional application No. 60/533,623, filed on Dec. 30, 2003.

(51) Int. Cl.
| | |
|---|---|
| A61F 2/00 | (2006.01) |
| A61F 2/16 | (2006.01) |
| C08F 2/00 | (2006.01) |
| C08F 12/24 | (2006.01) |
| C08F 16/12 | (2006.01) |
| C08F 30/08 | (2006.01) |
| C08F 112/14 | (2006.01) |
| C08F 116/12 | (2006.01) |
| C08F 130/02 | (2006.01) |
| C08F 212/14 | (2006.01) |
| C08F 216/12 | (2006.01) |
| C08F 230/08 | (2006.01) |
| C08G 85/00 | (2006.01) |

(52) U.S. Cl. .......... 526/72; 424/427; 526/279; 526/313; 623/6.11; 623/6.57; 623/6.6

(58) Field of Classification Search ........................ None
See application file for complete search history.

(56) References Cited

U.S. PATENT DOCUMENTS

| | | | | |
|---|---|---|---|---|
| 5,314,960 | A * | 5/1994 | Spinelli et al. | 525/280 |
| 5,331,073 | A * | 7/1994 | Weinschenk et al. | 526/264 |
| 6,689,480 | B2 * | 2/2004 | Shimoyama et al. | 428/451 |
| 6,992,118 | B2 * | 1/2006 | Sulc et al. | 523/106 |
| 2003/0195316 | A1 * | 10/2003 | Stark | 526/279 |

FOREIGN PATENT DOCUMENTS

| | | |
|---|---|---|
| EP | 0 336 318 | 10/1989 |
| EP | 1344 504 A2 | 9/2003 |
| JP | 04023819 | 1/1992 |
| WO | WO 93/21245 | 10/1993 |
| WO | WO 01/17570 | 3/2001 |

* cited by examiner

*Primary Examiner* — Juliet C Switzer
*Assistant Examiner* — Caralynne Helm

(57) ABSTRACT

A polymer material useful for manufacturing an intraocular lens (IOL) suitable for insertion through an IOL inserter barrel having an inner diameter of less than 3 mm is provided. Specifically, acrylic-silicone hybrids having a tensile strength of approximately 100 psi to 400 psi and a percent elongation at break of between 50% and 400% are disclosed.

7 Claims, 2 Drawing Sheets

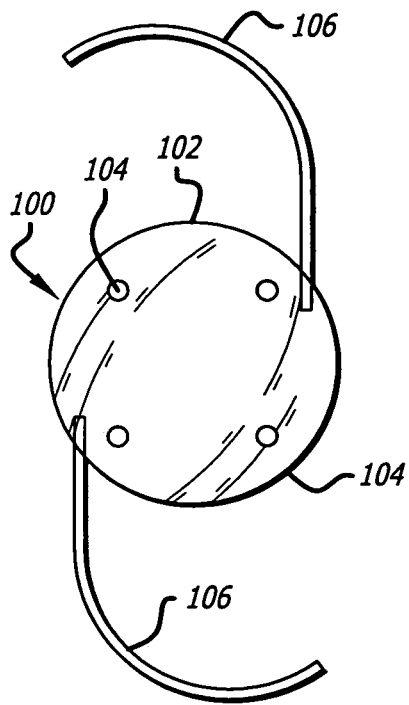
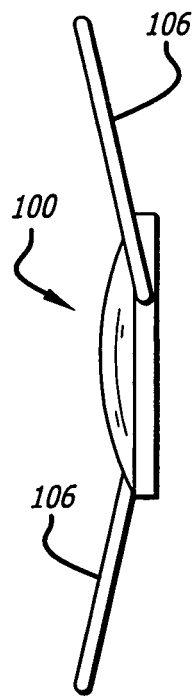
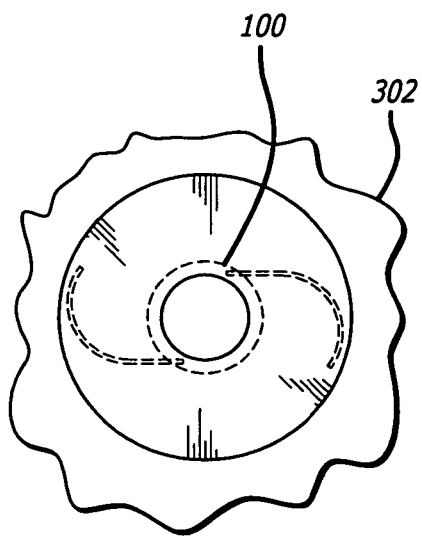
FIG. 1
FIG. 2
FIG. 3
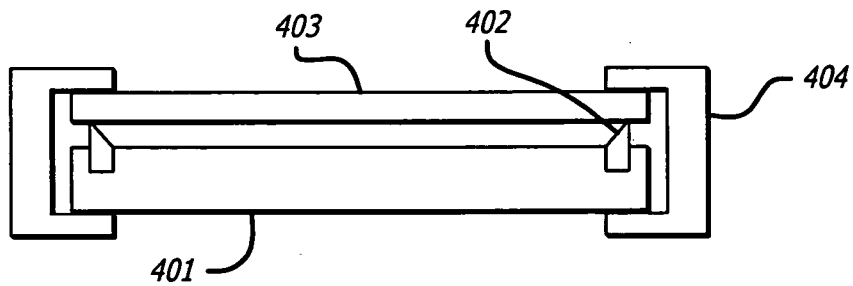
FIG. 4A
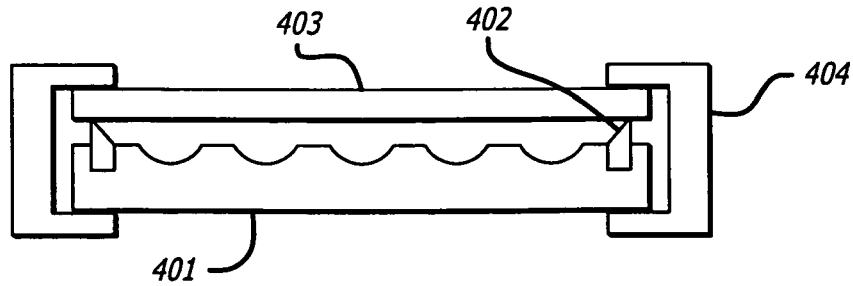
FIG. 4B

INTRAOCULAR LENS MATERIALS SUITABLE FOR INSERTION THROUGH A SMALL BORE CARTRIDGE

RELATED APPLICATIONS

The present application claims priority to U.S. provisional patent application Ser. No. 60/533,623 filed Dec. 30, 2003.

FILED OF THE INVENTION

The present invention relates to intraocular lens (IOL) materials suitable for insertion thorough small bore cartridges. Specifically, the present invention relates to IOLs comprising polymeric materials that facilitate IOL elongation under a low degree of applied force when confined to an IOL inserter having a bore diameter of 2.0 mm or less.

BACKGROUND OF THE INVENTION

Intraocular lenses (IOLs) were first used as a replacement for damaged natural crystalline lenses in 1949. These early IOL experiments were conducted in England by Dr. Howard Ridley an RAF ophthalmologist. Dr Ridley first observed acrylate polymer biocompatibility in the eyes of pilots who had sustained ocular injuries from polymethylmethacrylate (PMMA) shards when their aircraft canopies were shattered.

However, it took nearly thirty years for ophthalmologists to embrace IOL implantation as a routine method for restoring vision in patients suffering from diseased or damaged natural crystalline lenses. Early IOLs were made from PMMA because of its proven biocompatibility; however, PMMA IOLs require a 5 mm to 7 mm incision. Incision size is directly related to patient trauma, discomfort and healing times. Moreover, incisions sizes in the 5 mm to 7 mm range generally require sutures further increasing procedural complexity and patent discomfort.

Lens size dictates incision size and lens size is in turn determined by the size of the capsular sac and natural crystalline lens. Thus lenses made from a rigid polymer such as PMMA require an incision size at least as large as the minimum IOL dimension which is generally 5.5 mm on average. In an effort to decrease incision size and corresponding patient discomfort, recovery time and procedural complexity a number of IOL designs suitable for insertion through small incisions have been developed; most notably foldable IOLs. Foldable IOLs are made from non-rigid, or flexible polymers including hydrophobic acrylics, hydrophilic hydrogels, silicone elastomers and porcine collagen. Intraocular lenses made form these materials can be folded or rolled into implantable configurations having minimum dimensions suited for 3 mm incisions, or less.

Intraocular lenses made from flexible polymers are not easily manipulated especially after being rolled or folded. Thus these lenses must be manipulated using devices specifically manufactured for inserting the lens into the capsular sac through minute incisions. The IOL must be tightly folded or rolled prior to placing it into the inserter tip, or barrel. The smaller the incision size, the more tightly the IOL must be folded or rolled. Devices designed specifically to insert an IOL into the capsular sac are referred to generally as inserters.

The typical inserter is similar to a syringe in that it comprises a plunger-like device that engages the folded or rolled IOL restrained within a barrel-like tip. As pressure is exerted on the plunger the IOL is pushed out of the tip and into the eye. Once inside the capsular sac the IOL unfolds. The IOL may also include haptics which are spring-like arms that help hold the IOL in place. Sutures are generally not required with modern IOLs.

The IOL inserter barrel is generally made form polymers such as polyolefins which are highly hydrophobic. When a polymer IOL is pushed through the polyolefin barrel frictional forces impede the IOL's progress requiring increasing amounts of force. As the pressure increased the folded polymer IOL will tend to expand circumferentially inside the inserter as longitudinal movement is restricted by friction. If the friction coefficient of the tip relative to the lens is too great the lens may seize in the inserter tip making IOL delivery impossible. Moreover, the inserter tip may crack (craze) or even fracture as longitudinal pressure is increased resulting in IOL delivery failure.

In an effort to minimize friction within the inserter tip and ease IOL deployment numerous lubricious coatings have been developed. The lubricious coatings are generally composed of biocompatible hydrophilic polymers applied directly to the inserter interior surface. However, as incision sizes become progressively smaller, the inserter size begins to reach a diameter whereby lubricants alone no longer prove the lubricity required to overcome frictional forces. Furthermore, the higher the coefficient of friction between the IOL and lubricated inserter barrel, the greater the possibility that lubricant will be stripped from the barrel's interior surface and transferred to the IOL. Therefore, there is a need for IOL materials having inherently lower coefficients of friction relative to the lubricated inserter barrel. Moreover, some patients may be so hypersensitive to available lubricants that lubricant-free IOL delivery may be required in extreme cases. In these cases it is essential the IOL material have the lowest possible coefficient of friction.

Therefore, it is an object of the present invention to provide IOL materials having extremely low coefficients of friction that are suitable for insertion through either lubricated, non-lubricated, or small-bore inserter barrels. Moreover, it is an object of the present invention that these low coefficient of friction IOL materials possess excellent biocompatibility and optical qualities.

SUMMARY OF THE INVENTION

The present invention provides polymeric materials suitable for insertion through small-bore intraocular lens (IOL) inserter barrels. As used herein the term "small bore" refers to an IOL inserter barrel (AKA "tip" or "cartridge") having an inner diameter less than 3 mm. In one embodiment of the present invention the IOL materials are suitable for insertion through and IOL inserter barrel having an inner diameter of 2 mm or less.

The polymeric materials of the present invention are generally polymer blends and co-polymers comprising silicone and/or acrylates and acrylic-silicone hybrid polymers having low tensile strengths. The IOL materials of the present invention provide IOLs that pass through small incision cartridges with minimal cartridge crazing (no ruptures) and excellent resolution recovery. Moreover, the materials of the present invention have a glass transition temperatures similar to or lower than that of the acrylic IOL Sensar® (a registered Trademark of Advanced Medical Optics, Inc. Santa Ana, Calif.) and thus amendable to current sheet casting and manufacturing techniques. Moreover, IOLs made according to the teachings of the present invention are less likely to strip the lubricious coatings from the cartridge during lens insertion.

In one embodiment of the present invention an intraocular lens (IOL) material composed of a polymer suitable for insertion through an IOL insertion barrel having a diameter less than 3 mm wherein the polymer has a tensile strength of between approximately 100 psi and 400 psi and a percent elongation of 50% to 400% at break point is provided.

In another embodiment of the present invention the intraocular lens material according is an acrylic-silicone hybrid designated 3573.

BRIEF DESCRIPTION OF THE DRAWINGS

FIG. 1 is a front elevation view of an exemplary IOL formed in accordance with the novel features of the invention;

FIG. 2 is a side elevation view of the IOL depicted in FIG. 1;

FIG. 3 is a fragmented front elevation view depicting the IOL of FIG. 1 implanted into the posterior chamber of an eye;

FIGS. 4A and 4B illustrate two molds useful in the method of the present invention for forming acrylic material into intraocular lens bodies;

FIG. 5 also illustrates a plan view of the part produced from such a mold.

DETAILED DESCRIPTION OF THE INVENTION

Figure 5:
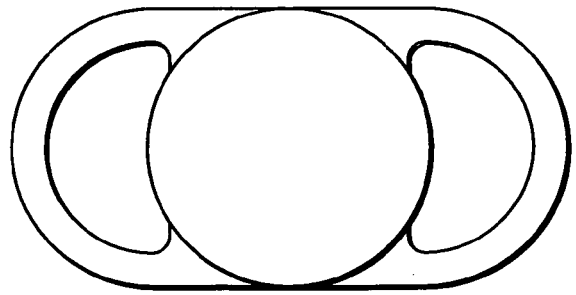
FIG. 5 is a plan view of a bottom part of a mold useful in forming a one piece IOL in accordance with the present invention.

Conventional foldable IOL materials have been designed to be tough (tensile strength>750 psi) and percent elongation (>100%). These properties give the IOL sufficient toughness and folding recovery allow for insertion through a 2.6~3.2 mm cartridge. Examples of foldable IOL materials include Sensar® acrylic (tensile—850 psi, % elongation—140%), SLM-2 silicone (% elongation—230%), and AcrySof®.

Whereas, even higher percent elongation is appropriate for materials capable of passing through bore cartridges less than 2 mm, it is imperative that an upper limit on the tensile strength of the material be in place rather than a lower limit as is conventionally done. When using cartridges designed for very small incision sizes (2.0 mm or less), the conventional, high tensile strength IOL materials require an excessive force (torque) to insert the lens. High torque levels result in unacceptable rates of cartridge rupture. To allow for efficient passage of an IOL through the small bore cartridge without rupture, the lens material must elongate under a low degree of applied force from the hand piece rod tip (i.e., low modulus). Thus, it is desirable to develop a foldable IOL material with low tensile forces that has sufficient percent elongation to allow delivery through a small bore cartridge.

The present inventors have developed materials including acrylics such as W28-15 and 32073 as well as hybrid acrylic materials such as W28-14S and 3573 acrylic-based materials having silicone performance enhancers (referred to herein after as silicone-acrylate hybrids). The silicone-acrylate hybrids of the present invention include both silicone-acrylate blends as well as silicone-acrylate co-polymers. When the IOL materials of the present invention having low tensile forces allowing for sufficient percent elongation for delivery through a small bore cartridge are made from silicone-acrylate co-polymers, the silicone monomers may be vinyl functionalized.

When tested using a 2.0 mm cartridge, foldable acrylic IOL materials having tensile strengths as low as 160 psi and percent elongation of 80%, readily outperformed materials with a tensile strength of over 800 psi with a percent of elongation of over 250%. No cartridge ruptures were observed when using the low tensile strength materials ("soft"), only the typical degree of cartridge crazing. In most cases, the "soft" materials had excellent optical resolution recovery after passage through the cartridge (resolution of at least 3-4).

Generally, the polymers of the present invention comprise acrylate blends comprising combinations of, but not limited to the following monomers: methyl methacrylate (MMA), ethyl acrylate (EA), ethyl methacrylate (EMA), phenoxy ethylacrylate (PEA), and phenyl ethyl methacrylate (PEMA). Additionally, the acrylate mixtures are cross-lined using, for example, ethylene glycol dimethacrylate (EGDMA), tetraethyleneglycol dimethacrylate (TEGDMA), 1,4-butanediol divinyl ether (BDDVE) or a similar cross-linking agent. In the case of the present invention the degree of cross-linking ranges from 1 to 10%. In a preferred embodiment of the present invention vinyl functional silicone fluid is added in the range of 1-30% of the final cross-linked polymer blend. All weights are given in weight percents (mass percents) of the final composition.

In one embodiment of the present invention, the hybrid polymer is prepared using from 10% to 50% EA, from 10% to 50% PEA, from 10% to 50% MMA and cross-linked with sufficient EGDMA to give from 1% to 10% cross-linking. Additionally, an amount equivalent to 10% final weight of polymer of a vinyl functional silicone fluid having a refractive index of 1.50+/−0.4 is added to form an acrylate-silicone hybrid polymer having the properties disclosed in Tables 1-6 below. Non-limiting representative a vinyl functionalized silicone fluids include divinyl silicone and hexavinyl silicone (HVS) HVS101802 and having the following formulation:

| HVS101802 | | | | |
|---|---|---|---|---|
| Material | Wt % | Wt | Mole % | $n_D$ |
| D4 | 40.36 | 100.91 | 60.88 | 1.404 |
| D4(ph) | 55.61 | 139.02 | 31.37 | 1.790 |
| M(iv) | 4.06 | 10.07 | 7.75 | 1.404 |
| N-cat | 0.25 | 0.63 | | |
| Totals | 100 | | 100 | 1.53 |

D4 Octomethylcyclotetrasiloxane (MW 296.6) Nusil catalog number SIL R-1002
D4(ph) Octophenylcyclotertrasiloxane (MW 793.18) Nusil catalog number SIL-8500
M(iv) hexavinylsisiloxane (MW 234.45) Gelest catalog number SIH61620
n-cat Tetramethylammonium siloxane UCT catalog number PC090-kg The following non-limiting examples provide formulations and corresponding physical and optical properties for the acrylate-silicone materials of the present invention. The material are useful for making intraocular lenses suitable for insertion through small-bore, or non-lubricious, IOL inserters. Persons having ordinary skill in the art of polymer science or polymer chemistry will recognize that these materials may be made by various synthetic methods. The synthetic methods provided here are thus merely representative examples and the compositions described and subsequently claimed are not limited to products by these processes.

Figure 6:
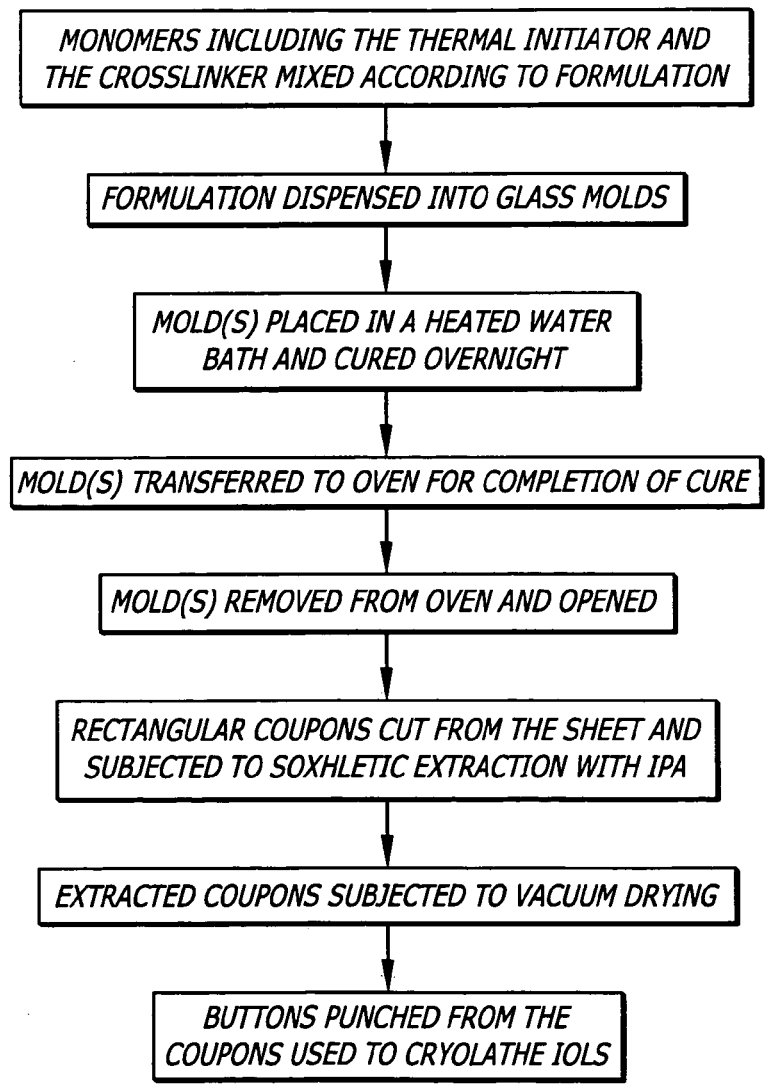
FIG. 6 is a flow diagram in block form illustrating a preferred form of a method for producing a acrylic-silicone hybrid material comprising a lens body of an IOL in accordance with the present, invention.

A representative method for forming the acrylic-silicone hybrids of the present invention is depicted in FIG. 6. As there represented the monomers including the thermal initiator and cross-linkers are mixed according to the formulations provided herein in the Examples. In addition to the monomers including the thermal initiator and cross-linkers, the mixture may also include other additives such as, but not limited to light absorbing dyes, surface energy lowering agents such fluoroacrylates and bioactive agents such as heparin. The light absorbing dyes may include UV-absorbers such as UV-2098 and/or blue light absorbing dyes such as azo dyes or methine dyes. The combination is mixed, deareated and dispensed into glass molds as depicted in FIGS. 4A and 4B. With respect to molds of FIG. 4, the resulting mixture is poured onto an aluminum plate 401 bounded by rubber gaskets 402. A glass plate 403 is placed on top of the rubber gaskets and the combination clamped together by clamps 404. Next the acrylic-silicone hybrid-containing molds are cured over night in a heated water bath at approximately 60° C.-80° C. (in one embodiment 78° C. is used) and then transferred to an oven and cured until completion at 80° C.-100° C. (in one embodiment 90° C. is used) (approximately 24 hours). The resulting cured polymer sheets, or rectangular coupons, are removed from their molds and residual isopropyl alcohol (IPA) is removed by soxhlet extraction. The extracted coupons are then dried in a vacuum oven and processed to form intraocular lenses by punching buttons from the coupons and shaping to the desired diopter using a cryolathe.

Lens fabrication is done using techniques known to those skilled in the art of optical device manufacturing and consists essentially of disassembling the mold and removing the polymer sheets formed therein made ready for cutting into cylindrical lens blanks in the case of mold number 1 or deflashing into lens bodies in the case of mold number 2. Alternatively, the mold bottom shown in FIG. 5 may be used. As illustrated, the mold has slots machined into its aluminum base to accommodate the haptics at an appropriate angle. The molded part from the mold of FIG. 5 comprises the optic and the haptic elements encased in a thin sheet of flash which may be machined off to produce the finished IOL.

Such cutting and machining to produce the desired IOL may involve conventional milling and lathe techniques with the exception that the part is held at a temperature well below room temperature and preferably between −80° C. and −10° C. Specifically, it is desired that the material be held below its Beta-relaxation temperature during cutting. Preferably, during cutting, the low temperature environment is formed by exposing the part to a liquid nitrogen spray which maintains the part within the desired temperature range and provides the desired moisture for the cutting operation.

An example of a procedure used to fabricate a multipiece IOL as shown in FIG. 1 including separate haptics is as follows. First, flat sheets of the acrylic-silicone hybrids of the present invention are molded at a thickness of between 2 mm and 8 mm as described above and mounted on holders. The material is then cut into disks 100 which are lathe cut at the low temperatures previously described to form the curved planar surfaces and edge cut. The resulting lens 102 bodies are soaked in Freon and chlorofluoro hydrocarbon solvent for 20 minutes and then dried for 30 minutes in a vacuum oven at 50° C.-100° C. The curved surfaces of the lens bodies 102 are then polished at a low temperature. Next, the lens bodies are mounted for drilling of the positioning holes 104 as well as the edge holes for receiving the haptics 106. The positioning holes are typically 0.3 mm while the edge holes for receiving the haptics are typically 0.1 mm in diameter. To mount the haptics into the edge holes, the haptics are located in a stainless steel needle and one end of the haptic melted to form a thickened blunt tip. The needle is then inserted into the edge hole to force the blunt end of the haptic into the hole at room temperature. The needle is carefully withdrawn allowing the walls of the edge hole to collapse back to their normal position clamping the haptic in place. This operation is then repeated for the other haptic.

Alternatively, for lens bodies molding using mold number 2 illustrated in FIG. 4B, the sheet is cored in the area of the lens bodies to cut the lens bodies from the sheet. The resulting lens bodies are then mounted in suitable holders and the foregoing procedure repeated.

The following examples provide preferred embodiments of the present invention. All weight percents (wt %) are approximate and may vary from the stated wt % range due to slight errors in weighing, calculations and rounding errors. Moreover, rounding errors may result in the wt % in specific Examples not adding up to exact 100%. This outcome is acceptable and understood by those having ordinary skill in the art. However, the wt % of each component in the following Examples cannot vary so much as to result in an IOL material unsuited for insertion through an IOL inserter having a barrel diameter of 2 mm or less.

EXAMPLES

Example 1

| General formulation for one embodiment of the present invention | |
|---|---|
| Phenoxyethyl acrylate (PEA) | 30-40 weight percent (wt. %) |
| Phenyl ether methacrylate (PEMA) | 15-25 wt % |
| Ethyl Acrylate (EA) | 25-35 wt % |
| Methyl methacrylate (MMA) | 5-15 wt % |
| 1,4-butanediol divinyl ether (BDDVE) | 0.2-1.0 wt % |
| UV Blocker | 1.0-1.5 wt % |
| Luperox ® [1] 256 (thermal initiator 2,5-dimethyl-2,5-di-(2-ethylhexanoyl-peroxy)hexane) | 0.1-0.5 wt % |
| HVS 101802 | 2-7 wt % |

[1] Luperox ® is a registered trademark of Arkema, Inc. Philadelphia, PA.

Example 2

| General formulation for another embodiment of the present invention | |
|---|---|
| Phenoxyethyl acrylate (PEA) | 45-55 wt % |
| Ethyl acetate (EA) | 15-25 wt % |
| Ethyl methacrylate (EMA) | 15-25 wt % |
| Divinyl silicone (DVS) | 5-15 wt % |
| Ethyleneglycol dimethacrylate (EGDMA) | 0.2-0.7 wt % |
| Tetraethyleneglycol dimethacrylate (TEGDMA) | 0.2-0.7 wt % |
| Trigonox ® [2] 141 (thermal initiator 2,5-Dimethyl-2,5-di-(2-ethylhexanoylperoxy)hexane) | 0.5-1.5 wt % |

[2] Trigonox ® is a registered trademark of Akzo Chemicals, B.V. The Netherlands The foregoing examples are meant to be illustrative. It is well known in the art that other initiators could be used in accordance with the teaching herein and combined with what is known in the art. Other suitable thermal initiators include, for example other organic peroxides. Moreover, it is understood that the ranges of monomers and other constituents in Examples 1 and 2 include all integers and fractions thereof within the ranges of the weight percents given. Furthermore, each formulation may have one or more additional additive such as but not limited to light absorbing dyes including UV blockers and blue-light, blue-violet light blockers known to those skilled in the art. Non-limiting examples of UV blockers suitable for use in accordance with the teachings of the present invention include benzophenone and benzotriazole-based UV light absorbers. Moreover, many benzophenones and benzotriazoles are polymerizable and thus can be stably integrated into most modern IOL compositions.

Blue light absorbing compositions suitable for use in accordance with the teachings of the present invention include but not limited to polymerizable yellow dyes based on the azo dye system that contain polymerizable acrylate/methacrylate groups such as those disclosed in U.S. Pat. No. 5,662,707, the entire contents of which is hereby incorporated herein by reference, specifically column 4 beginning at line 43 through column 10 line 3. Other suitable yellow dues include, without limitation, methine dyes, benzene sulfonic acid, 4-(4,5-dihydro-4-((2-methoxy-5-methyl-4-((2-(sulfooxy)ethyl)sulfonyl)phenyl)azo-3-methyl-5-oxo-1H-pyrazol-1-yl); [2-naphthalene-sulfonic acid, 7-(acetylamino)-4-hydroxyl-3-((4-((sulfooxyethyl)sulfonyl)phenyl) azo)-]; [5-((4,6-dichloro-1,3,5-triazin-2-yl)amino-4-hydroxy-3-((1-sulfo-2-naphthal enyl)azo-2,7-naphthalene-disulfonic acid, trisodium salt]; [copper, 29H, 31H-phthalocyaninato(2-)-$N_{29}$, $N_{30}$, $N_{31}$, $N_{32}$)-, sulfo((4((2-sulfooxy)ethyl)sulfonyl) phenyl)amino)sulfonyl derivative]; and [2,7-naphthalene-sulfonic acid, 4-amino-5-hydroxy-3,6-bis((4-((2-(sulfooxy) ethyl)sulfonyl)phenyl)azo)-tetrasodium salt] and others. Theses dyes are particularly beneficial because they are reactive dyes that can be chemically bonded to the IOL polymer so that the lens is colorfast and the dye is non-extractable (i.e. will not bleed or leach out of the lens). However, it is not essential that the dye be polymerizable or capable of bonding to the IOL polymer for example, Solvent Yellow dyes may also be used in accordance with the teachings of the present invention as may any dye capable of absorbing the desired wavelength of light.

Example 3

| Formulation of Acrylate-Silicone Hybrid Polymer Number W-28-14S | |
|---|---|
| PEA | 34.2 wt % |
| PEMA | 19.5 wt % |
| EA | 29.3 wt % |
| MMA | 9.8 wt % |
| BDDVE | 0.5 wt % |
| UV Blocker | 1.2 wt % |
| Thermal Initiator | 0.3 wt % |
| HVS101802 | 4.8 wt % |

The monomers, cross-linker, silicone fluid, initiator and other additives of Example 3 are mixed and processed into the intraocular lenses of the present invention according to the teachings here in as depicted in FIGS. 4, 5 and 6.

Example 4

| Formulation of Acrylate-Silicone Hybrid Polymer Number 3573 | |
|---|---|
| PEA | 49.0 wt % |
| EMA | 21.0 wt % |
| EA | 19.0 wt % |
| EGDMA | 0.40 wt % |
| TEGDMA | 0.3 wt % |
| UV Blocker | 1.2 wt % |
| Thermal initiator | 1.1 wt % |
| DVS | 9.0 wt % |

The monomers, cross-linker(s), silicone fluid, initiator and other additives of Example 4 are mixed and processed into the intraocular lenses of the present invention according to the teachings here in as depicted in FIGS. 4, 5 and 6. Note that more than one cross-linker may be used in accordance with the teachings of the present invention. In such cases the range of wt % s may be doubled to reflect additional cross-linker additive. For example, in Example 4 two cross-linkers ate listed EGMA and TEGDMA. The weight percent range for each is 0.2 wt % to 0.7 wt %. Thus if both are used the weight percent range for the total cross-linker components is 0.2 wt % to 1.4 wt %. Furthermore, it is understood that the IOL materials of the present invention (and thus the resultant IOLs) may also include one or more polymer additives, such as but not limited to UV light absorbers, blue light blockers, lubricious surface coatings, anti-thrombogenic compositions and cell growth agonists or antagonists (as well as other bioactive agents).

Tables 1-6 (below) provide comparison testing of selected physical, mechanical and optical qualities of the candidate IOL materials made in accordance with the teachings of the present invention compared with a prior art acrylate IOL (Sensar®[3]).

[3] Sensar® is a registered trademark of Advanced Medical Optics, Santa Ana, Calif.

TABLE 1

Mechanical Test Results for IOLs made in Accordance with the Teachings: Cartridge performance through a 2.0 mm diameter barrel using a 20D AR40x optic lens design

| Material | Torque (g-cm) | Median Resolut. | Cart Damag | Unfold Rate | Tack |
|---|---|---|---|---|---|
| W28-14S Hybrid | 710 | 3-4 | 2 | Mod | 3 |
| 3573 Hybrid | 550 | 3-4 | 2 | Mod | 3 |
| Sensar ® | >2000 | 0 | 5+ | Good | 2 |

1 = low
5 = High
"D" equal diopter

TABLE 2

Biocompatibility

| Material | Cytotoxicity | Rabbit Implant |
|---|---|---|
| W28-14S Hybrid | Non-toxic | Non-toxic |
| 3573 Hybrid | Non-toxic | Non-toxic |
| Sensar ® | Not Tested | Not Tested |

TABLE 3

Optical Test Results

| Material | RI | Abbe # | UV/Vis | Haze (Aq) |
|---|---|---|---|---|
| W28-14S Hybrid | 1.525 | 40.5 | Pas | 3-4 |
| 3573 Hybrid | 1.521 | 42.1 | Pass | 2 |
| Sensar ® | 1.476 | 54.9 | Pass | 2-4 |

Target Refractive Index (RI) = 1.52

TABLE 4

Thermal Testing

| Material | Glass Transition Temperature (Tg) (° C.) |
|---|---|
| W28-14S Hybrid | 12.1 ± 2.3 |
| 3573 Hybrid | 10.4 ± 0.5 |
| Sensar ® | 13.8 |

TABLE 5

Mechanical Testing Part 1

| Material | % Elongation at Break | Tensile Strength at Max PSI |
|---|---|---|
| W28-14S Hybrid | 380 | 530 |
| 3573 Hybrid | 290 | 350 |
| Sensar ® | 160 | 970 |

TABLE 6

Mechanical Testing Part 2

| Material | Modulus at Selected % Elongation, PSI | | | |
|---|---|---|---|---|
| | 10% | 25% | 50% | 100% |
| W28-14S Hybrid | 296 | 105 | 56 | 47 |
| 3573 Hybrid | 178 | 105 | 58 | 44 |
| Sensar ® | 1108 | 322 | 259 | 392 |

Based on the testing as reported above in Tables 1-6, the acrylic-silicone hybrid 3573 demonstrated low torque during insertion, good resolution recovery post insertion, the best unfolding rate (1-3 seconds), the refractive index and Tg were within preferred ranges, there was low haze after aqueous testing (up to four weeks) the material is biocompatible and is easily manufactured. Furthermore, Table 1 clearly demonstrates that significantly less torque is required to deploy the acrylic-silicone hybrid lenses of the present invention than the state-of-the-art acrylate IOL.

What is claimed is:

1. An intraocular lens copolymer material comprising from approximately 45 wt % to approximately 55 wt % phenoxyethyl acrylate, from approximately 15 wt % to approximately 25 wt % ethyl acrylate, from approximately 15 wt % to approximately 25 wt % ethyl methacrylate, from approximately 5 wt % to approximately 15 wt % divinyl silicone, from approximately 0.2 wt % to approximately 0.7 wt % ethyleneglycol dimethacrylate, and from approximately 0.2 wt % to approximately 0.7 wt % tetraethyleneglycol dimethacrylate.

2. The intraocular lens material according to claim 1 wherein said IOL material further comprises a polymer additive selected from the group consisting of UV light absorbers, blue light blockers, lubricious surface coatings, anti-thrombogenic compositions and cell growth agonists or antagonists.

3. An intraocular lens made from an intraocular lens material of claim 1 said intraocular lens material is suitable for insertion through an IOL insertion barrel having a diameter of 2 mm or less.

4. An intraocular lens material comprising approximately 49 wt % phenoxyethyl acrylate, approximately 19 wt % ethyl acrylate, approximately 21 wt % ethyl methacrylate, approximately 9 wt % divinyl silicone, approximately 0.4 wt % ethyleneglycol dimethacrylate, and approximately 0.3 wt % tetraethyleneglycol dimethacrylate.

5. The intraocular lens materials according to claim 4 wherein said IOL material further comprises a polymer additive selected from the group consisting of UV light absorbers, blue light blockers, lubricious surface coatings, anti-thrombogenic compositions and cell growth agonists or antagonists.

6. An intraocular lens made from an intraocular lens material of claim 4 said intraocular lens material is suitable for insertion through an IOL insertion barrel having a diameter of 2 mm or less.

7. The intraocular lens material as in one of claims 1-6 in which said intraocular lens material has a tensile strength of between approximately 100 psi and 400 psi and a percent elongation of 50% to 400% at break point.

* * * * *

UNITED STATES PATENT AND TRADEMARK OFFICE
CERTIFICATE OF CORRECTION

| | |
|---|---|
| PATENT NO. | : 7,928,171 B2 |
| APPLICATION NO. | : 11/027876 |
| DATED | : April 19, 2011 |
| INVENTOR(S) | : Harish C. Makker et al. |

It is certified that error appears in the above-identified patent and that said Letters Patent is hereby corrected as shown below:

At column 6, line 43 please delete term "acetate" replacing with term "acrylate"

Signed and Sealed this
Twenty-fourth Day of April, 2012

David J. Kappos
*Director of the United States Patent and Trademark Office*